(12) United States Patent
Cai et al.

(10) Patent No.: US 11,422,296 B2
(45) Date of Patent: Aug. 23, 2022

(54) LIGHT-EMITTING MODULE STRUCTURE

(71) Applicant: Lextar Electronics Corporation, Hsinchu (TW)

(72) Inventors: Pei-Song Cai, Hsinchu (TW); Lung-Kuan Lai, Hsinchu (TW); Shih-Yu Yeh, Hsinchu (TW); Guan-Zhi Chen, Hsinchu (TW); Hong-Zhi Liu, Hsinchu (TW); Kuo-Yen Chang, Hsinchu (TW); Ching-Hua Li, Hsinchu (TW)

(73) Assignee: Lextar Electronics Corporation, Hsinchu (TW)

( * ) Notice: Subject to any disclaimer, the term of this patent is extended or adjusted under 35 U.S.C. 154(b) by 0 days.

(21) Appl. No.: 17/134,548

(22) Filed: Dec. 28, 2020

(65) Prior Publication Data

US 2021/0116625 A1 Apr. 22, 2021

Related U.S. Application Data

(62) Division of application No. 16/373,651, filed on Apr. 3, 2019, now Pat. No. 10,908,344.

(30) Foreign Application Priority Data

Apr. 19, 2018 (CN) .......................... 201810354383.0

(51) Int. Cl.
*G02B 6/00* (2006.01)
*F21V 8/00* (2006.01)

(52) U.S. Cl.
CPC ......... *G02B 6/0038* (2013.01); *G02B 6/0023* (2013.01); *G02B 6/0036* (2013.01); *G02B 6/0055* (2013.01); *G02B 6/0073* (2013.01); *G02B 6/0083* (2013.01)

(58) Field of Classification Search
CPC ......... G02F 1/133603; G02F 1/133605; G02F 1/133606; G02F 1/133614
USPC ...................................................... 362/606
See application file for complete search history.

(56) References Cited

U.S. PATENT DOCUMENTS

| 5,013,144 A | 5/1991 | Silverglate et al. |
| 9,678,382 B2 ‡ | 6/2017 | Park ...................... G02B 6/0055 |
| 9,715,058 B1 ‡ | 7/2017 | Zhang .................. G02B 6/0036 |
| 2004/0080938 A1 ‡ | 4/2004 | Holman ............. G02B 27/1046 362/231 |
| 2004/0218390 A1 ‡ | 11/2004 | Holman ............... G02B 17/002 362/245 |

(Continued)

FOREIGN PATENT DOCUMENTS

| CN | 201228924 Y | 4/2009 |
| CN | 102487063 A | 6/2012 |

(Continued)

*Primary Examiner* — Christopher M Raabe
(74) *Attorney, Agent, or Firm* — CKC & Partners Co., LLC

(57) ABSTRACT

A light-emitting module structure includes a substrate, a plurality of light-emitting diodes (LEDs) disposed on the substrate, and a light-guiding layer covering the light-emitting diodes. The light-guiding layer has an upper surface, the upper surface has a plurality of recesses, and the recesses are above the light-emitting diodes or between the light-emitting diodes. This light-emitting module structure can improve the brightness and uniformity of the light-emitting module.

12 Claims, 15 Drawing Sheets

(56) References Cited

U.S. PATENT DOCUMENTS

| | | | |
|---|---|---|---|
| 2009/0073350 A1* | 3/2009 | Toyama | G02F 1/133611 349/69 |
| 2009/0086508 A1‡ | 4/2009 | Bierhuizen | G02B 6/0021 362/617 |
| 2010/0039832 A1‡ | 2/2010 | Ahlgren | G02B 6/0013 362/613 |
| 2010/0046219 A1‡ | 2/2010 | Pijlman | G02B 6/0021 362/235 |
| 2011/0050558 A1‡ | 3/2011 | Park | G02B 6/0068 345/102 |
| 2012/0069575 A1‡ | 3/2012 | Koh | G02B 6/0036 362/296.01 |
| 2014/0177274 A1 | 6/2014 | Chen et al. | |
| 2014/0204578 A1* | 7/2014 | Kim | F21V 7/00 362/235 |
| 2017/0122529 A1‡ | 5/2017 | Yamada | F21V 3/08 |
| 2018/0052259 A1 | 2/2018 | Chang et al. | |
| 2018/0080625 A1* | 3/2018 | Yamada | G02F 1/133605 |
| 2019/0285246 A1* | 9/2019 | Yamamoto | H01L 33/50 |
| 2019/0324193 A1‡ | 10/2019 | Crompvoets | G02F 1/133603 |

FOREIGN PATENT DOCUMENTS

| | | | | |
|---|---|---|---|---|
| CN | 103299236 A | | 9/2013 | |
| CN | 104566211 A | | 4/2015 | |
| CN | 103411167 B | | 8/2015 | |
| CN | 206149420 U | ‡ | 5/2017 | |
| CN | 206149420 U | | 5/2017 | |
| CN | 206248864 U | ‡ | 6/2017 | |
| CN | 206248864 U | | 6/2017 | |
| TW | 201106065 A | ‡ | 2/2011 | |
| TW | 201106065 A | | 2/2011 | |
| TW | I503581 B | ‡ | 10/2015 | |
| TW | I503581 B | | 10/2015 | |
| WO | 2005022654 A2 | | 3/2005 | |
| WO | WO-2005022654 A2 | ‡ | 3/2005 | H01L 33/387 |

\* cited by examiner

‡ imported from a related application

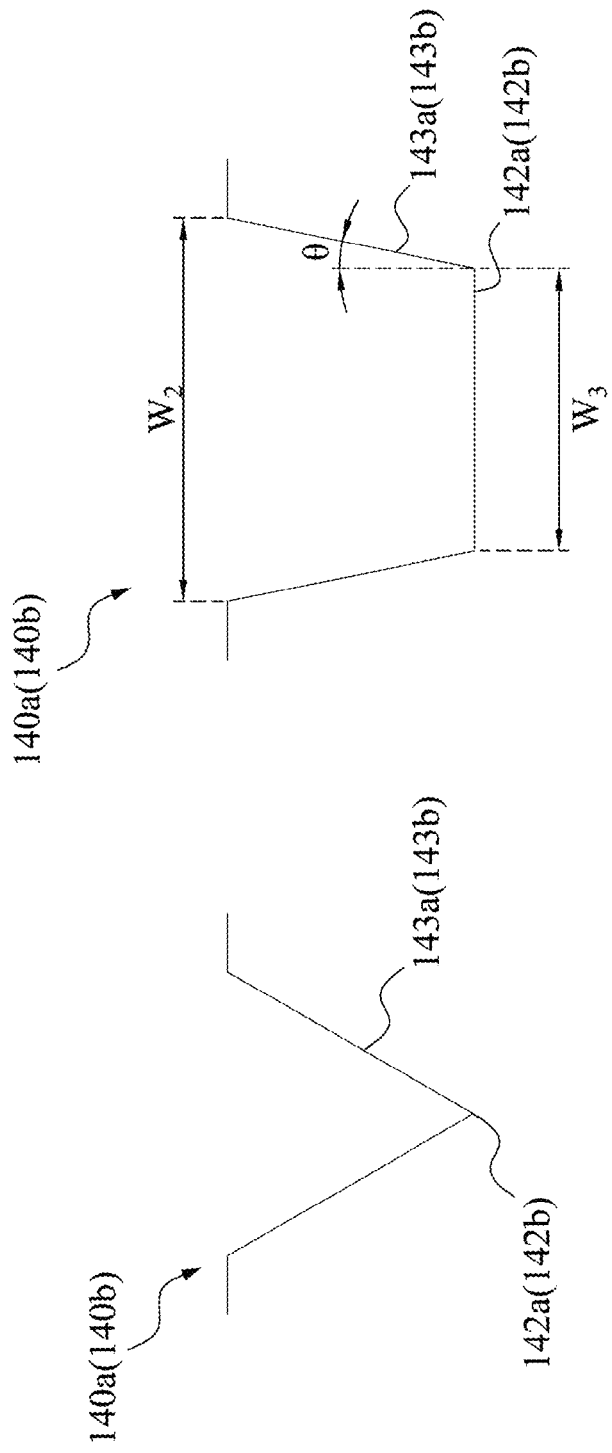

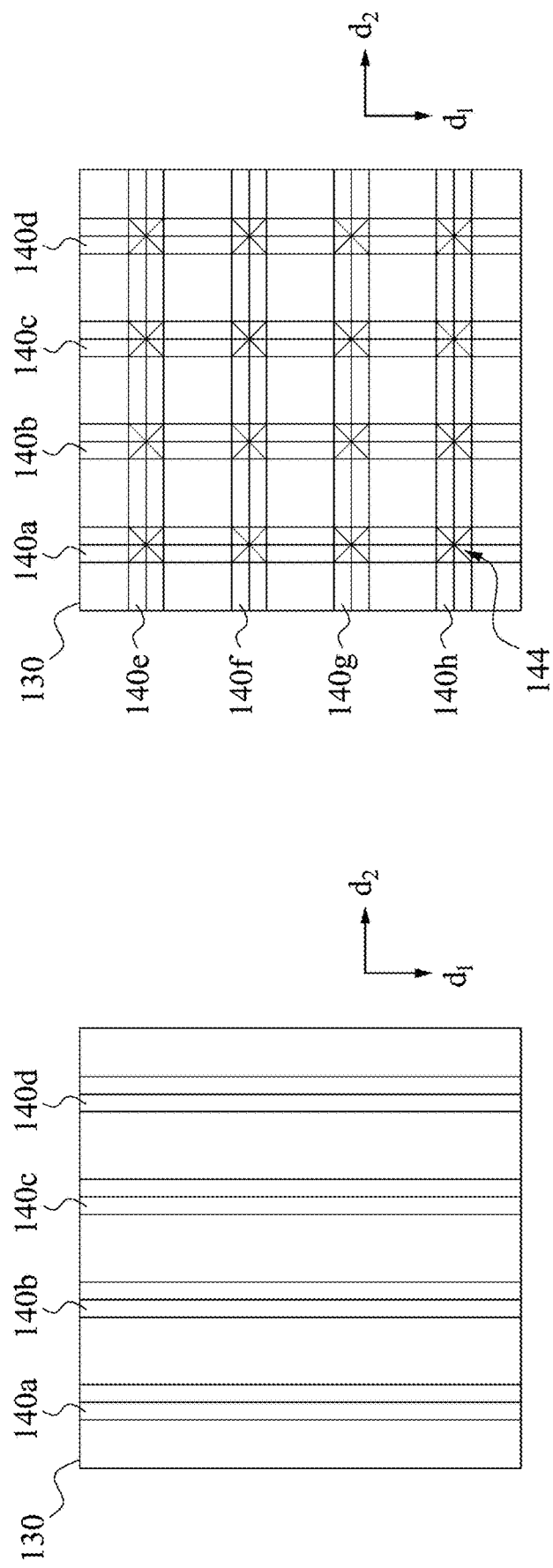

LIGHT-EMITTING MODULE STRUCTURE

CROSS-REFERENCE TO RELATED APPLICATION

The present application is a Divisional Application of the U.S. application Ser. No. 16/373,651, filed Apr. 3, 2019, which claims priority to China Application Serial Number 201810354383.0, filed Apr. 19, 2018, all of which are herein incorporated by their entireties.

BACKGROUND

Field of Invention

The present invention relates to a light-emitting module structure.

Description of Related Art

Over recent years, the light-emitting diodes (LEDs) have gradually replaced traditional light sources due to its advantages such as small volume, high brightness, and low power consumption. Currently, the LED has been widely applied to back light modules. Conventional direct-type back light modules mostly use frame type package, which has small light-emitting angle and low light-emitting efficiency. Furthermore, the conventional back light module has relatively short light transmission path. When a distance between the light-emitting diodes is too long, a dark zone will be formed between the light-emitting diodes, resulting in poor visual perception. The aforementioned issues may be improved by reducing the distance between the light-emitting diodes, but the number of the light-emitting diodes is inevitably increased while the distance is reduced, causing an increase of cost.

Therefore, there is a demand for a light-emitting module structure to solve the issues aforementioned.

SUMMARY

According to various embodiments of the present invention, a light-emitting module structure is provided. The light-emitting module structure includes a substrate, a plurality of light-emitting diodes disposed on the substrate, and a light-guiding layer covering the light-emitting diodes. The light-guiding layer has an upper surface which has a plurality of recesses positioned above the light-emitting diodes.

According to some embodiments of the present invention, the light-emitting module structure further includes a plurality of crosstalk resistant structures disposed on the substrate, and each of the crosstalk resistant structures is between the light-emitting diodes.

According to some embodiments of the present invention, the light-emitting module structure further includes a plurality of scattering structures located on the substrate, and each of the scattering structures is arranged between two adjacent light-emitting diodes and disposed on two opposite sides of the each of the crosstalk resistant structures.

According to some embodiments of the present invention, the light-emitting module structure further includes a plurality of reflection structures disposed on the substrate, and each of the reflection structures is arranged between two adjacent light-emitting diodes and disposed on two opposite sides of the crosstalk resistant structures.

According to some embodiments of the present invention, the light-emitting diodes are arranged as a regular hexagon, and each of the crosstalk resistant structures is positioned at a center of the regular hexagon.

According to some embodiments of the present invention, the crosstalk resistant structures include a plurality of cones or a plurality of cylinders, and each of the crosstalk resistant structures has a height which is greater than or equal to a height of the light-emitting diode.

According to some embodiments of the present invention, each of the recesses has an opening and a bottom, each of the openings has a width, each of the bottoms is aligned with each of the light-emitting diodes, a vertical distance is between each of the aligned bottoms and the light-emitting diodes, and the ratio of the width to the vertical distance is about 0.85-3.5.

According to some embodiments of the present invention, the light-emitting module structure further includes at least one reflection structure disposed on a part of the upper surface of the light-guiding layer, where the reflection structure has a reflection surface immediately neighboring the upper surface, and the reflection surface is a scattering reflection surface or mirror reflection surface.

According to some embodiments of the present invention, the recesses include cone recesses or cylindrical recesses.

According to some embodiments of the present invention, the recesses include a plurality of first V-shaped trenches extending along a first direction.

According to some embodiments of the present invention, the recesses further include a plurality of second V-shaped trenches extending along a second direction, the second direction is different from the first direction, and the first V-shaped trenches intersect with the second V-shaped trenches to form a plurality of intersections.

According to some embodiments of the present invention, the light-emitting module structure further includes a phosphor layer or quantum dot layer on the upper surface of the light-guiding layer.

According to some embodiments of the present invention, the light-emitting module structure further includes a phosphor layer covering at least one of the light-emitting diodes.

According to some embodiments of the present invention, the upper surface of the light-guiding layer is a reflection surface or a refraction surface.

According to some embodiments of the present invention, the light-emitting module structure further includes a concave structure disposed between the substrate and each of the light-emitting diodes.

According to some embodiments of the present invention, the light-emitting module structure further includes a transparent glue layer disposed on the upper surface of the light-guiding layer, and the transparent glue layer fills the recesses.

According to some embodiments of the present invention, the transparent glue layer in the recesses has a protruding glue accumulation portion.

According to some embodiments of the present invention, the substrate has at least one cavity, and at least one of the light-emitting diodes is correspondingly disposed in the at least one cavity, where the light-emitting diodes are chip size package light-emitting diodes.

According to various embodiments of the present invention, a light-emitting module structure is provided. The light-emitting module structure includes a substrate, a plurality of light-emitting diodes disposed on the substrate, and a light-guiding layer covering the light-emitting diodes. The light-guiding layer has an upper surface, the upper surface has a plurality of recesses, and each of the recesses is between the light-emitting diodes.

According to some embodiments of the present invention, the light-emitting module structure further includes a plurality of crosstalk resistant structures disposed on the substrate, and the each of the crosstalk resistant structures is between the light-emitting diodes.

According to some embodiments of the present invention, the light-emitting module structure further includes a plurality of scattering structures disposed on the substrate, and each of the scattering structures is arranged between two adjacent light-emitting diodes and disposed on two opposite sides of each of the crosstalk resistant structures.

According to some embodiments of the present invention, the light-emitting module structure further includes a plurality of reflection structures disposed on the substrate, and each of the reflection structures is arranged between two adjacent light-emitting diodes and disposed on two opposite sides of each of the crosstalk resistant structures.

According to some embodiments of the present invention, the light-emitting diodes are arranged as a regular hexagon, and each of the crosstalk resistant structures is positioned at a center of the regular hexagon.

According to some embodiments of the present invention, the crosstalk resistant structures include a plurality of cones or a plurality of cylinders, and each of the crosstalk resistant structures has a height which is greater than or equal to a height of each of the light-emitting diode.

According to some embodiments of the present invention, the light-emitting module structure further includes at least one reflection structure disposed on a part of the upper surface of the light-guiding layer, where the reflection structure has a reflection surface immediately neighboring the upper surface, and the reflection surface is a scattering reflection surface or mirror reflection surface.

According to some embodiments of the present invention, the recesses include a plurality of first V-shaped trenches extending along a first direction.

According to some embodiments of the present invention, the recesses further include a plurality of second V-shaped trenches extending along a second direction, the second direction is different from the first direction, and the first V-shaped trenches intersect with the second V-shaped trenches to form a plurality of intersections.

According to some embodiments of the present invention, the light-emitting module structure further includes a transparent glue layer disposed on the upper surface of the light-guiding layer, and the transparent glue layer fills the recesses.

According to some embodiments of the present invention, the transparent glue layer in the recesses has a protruding glue accumulation portion.

According to some embodiments of the present invention, the substrate has at least one cavity, and at least one of the light-emitting diodes is correspondingly disposed in the at least one cavity, where the light-emitting diodes are chip size package light-emitting diodes.

It is to be understood that both the foregoing general description and the following detailed description are by examples, and are intended to provide further explanation of the invention as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A-2B are cross-sectional views of recesses of the light-emitting module structure according to some embodiments of the present invention.

FIGS. 3A-3B are schematic top views of a light-guiding layer according to some embodiments of the present invention.

DETAILED DESCRIPTION

The following embodiments are disclosed with accompanying diagrams for detailed description. For illustration clarity, many details of practice are explained in the following descriptions. However, it should be understood that these details of practice do not intend to limit the present invention. That is, these details of practice are not necessary in parts of embodiments of the present invention. Furthermore, for simplifying the drawings, some of the conventional structures and elements are shown with schematic illustrations.

The relative terms, such as "lower" or "bottom" and "upper" or "top", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Figure 1:
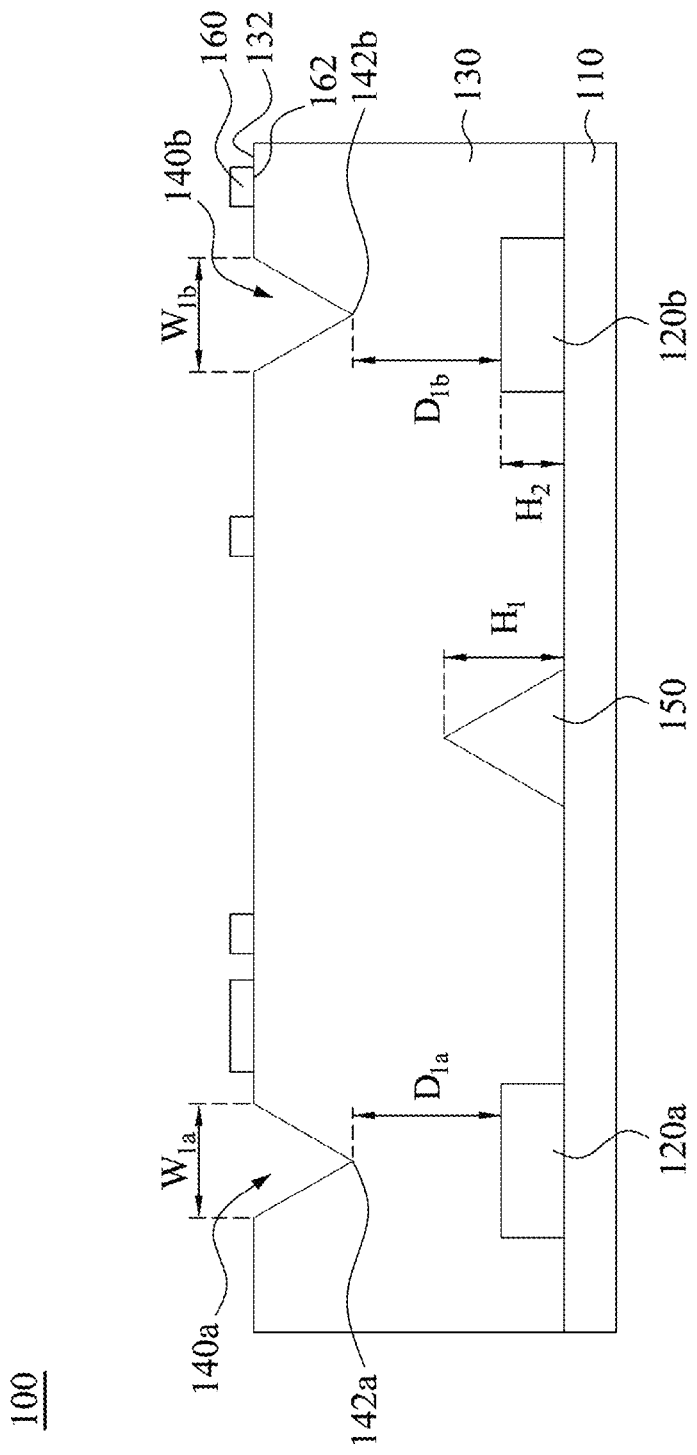
FIG. 1 is a cross-sectional view of a light-emitting module structure according to various embodiments of the present invention.

FIG. 1 is a cross-sectional view of a light-emitting module structure 100 depicted according to some embodiments of the present invention. Referring to FIG. 1, the light-emitting module structure 100 includes a substrate 110, a plurality of light-emitting diodes (e.g., light-emitting diodes 120a, 120b) and a light-guiding layer 130. The light-emitting diodes 120a and 120b are disposed on the substrate 110. The light-guiding layer 130 covers the light-emitting diodes 120a and 120b. The light-emitting module structure 100 may further includes other elements which will be described below.

The substrate 110 may include any suitable substrate. In some embodiments, the substrate 110 may be a transparent substrate or an opaque substrate. In some embodiments, the substrate 110 may be a flexible substrate. Therefore, the light-emitting module structure 100 may be applied to a light-emitting module of a highly-curved back light form. In other embodiments, the substrate 110 may be a rigid substrate. For example, the substrate 110 may be but not limited to a sapphire substrate, a silicon substrate, a glass substrate, a printed circuit board, a metal substrate, or a ceramic substrate. In some embodiments, the substrate 110 may further include a conductive structure (not shown in FIG. 1). In some embodiments, the substrate 110 may be electrically connected to the light-emitting diodes 120a and 120b via the conductive structure (not shown in FIG. 1).

The light-emitting diodes 120a and 120b may be light-emitting diodes of any light-emitting wavelengths. In some embodiments, the light-emitting diodes 120a and 120b may be the same light-emitting diodes. For example, the light-emitting diodes 120a and 120b are both blue light-emitting diodes. In other embodiments, the light-emitting diodes 120a and 120b may be the different light-emitting diodes. For example, the light-emitting diode 120a is a blue light-emitting diode, while the light-emitting diode 120b is an ultraviolet light-emitting diode. The light-emitting diodes 120a and 120b may be light-emitting diodes of any size. In some embodiments, the light-emitting diodes 120a and 120b may be Mini light-emitting diodes (Mini LEDs). For example, the size of the light-emitting diodes 120a and 120b may be about 100 μm, 150 μm, 200 μm, 250 μm, 300 μm, 350 μm, or 400 μm. In other embodiments, the light-emitting diodes 120a and 120b may be micro light-emitting diodes (Micro LEDs). For example, the die sizes of the light-emitting diodes 120a and 120b may be respectively about 30 μm, 40 μm, 50 μm, 60 μm, 70 μm, 80 μm, or 90 μm. In some embodiments, the light-emitting diodes 120a and 120b may be chip size package (CSP) light-emitting diodes or flip chip light-emitting diodes.

In some embodiments, the light-guiding layer 130 includes any suitable transparent glue materials. In some embodiments, the light-guiding layer 130 has a refractive index from about 1.49 to about 1.6. For example, the light-guiding layer 130 may be but not limited to a silicone resin. In some embodiments, the upper surface 132 of the light-guiding layer 130 has recesses 140a and 140b, as shown in FIG. 1. The recesses 140a and 140b are respectively positioned above the light-emitting diodes 120a and 120b. In some embodiments, the upper surface 132 of the light-guiding layer 130 may not have recesses 140a or 140b. For example, the upper surface 132 of the light-guiding layer 130 may be a glossy transparent surface. In some embodiments, the upper surface 132 of the light-guiding layer 130 is a reflection surface and/or refraction surface. The upper surface 132 of the light-guiding layer 130 may reflect and/or refract lights emitted from the light-emitting diodes 120.

As shown in FIG. 1, the upper surface 132 of the light-guiding layer 130 has the recesses 140a and 140b, and the recesses 140a and 140b are respectively above the light-emitting diodes 120a and 120b. The recesses 140a and 140b may change a total reflection angle of a light in the light-guiding layer 130, such that the light may be distributed uniformly. The recess 140a has an opening width $W_{1a}$ and a bottom 142a, and the recess 140b has an opening width $W_{1b}$ and a bottom 142b. In some embodiments, the bottom 142a of the recess 140a is aligned with the light-emitting diode 120a, and the bottom 142b of the recess 140b is aligned with the light-emitting diode 120b. In some embodiments, there is a vertical distance $D_{1a}$ between the bottom 142a and the light-emitting diode 120a, and the ratio of the opening width $W_{1a}$ to the vertical distance $D_{1a}$ is from about 0.85 to 3.5, such as 0.9, 1.2, 1.5, 2.0, 2.2, 2.5, 2.7, 3.0, or 3.2. In some embodiments, there is a vertical distance $D_{1b}$ between the bottom 142b and the light-emitting diode 120b, and the ratio of the opening width $W_{1b}$ to the vertical distance $D_{ib}$ is from about 0.85 to 3.5, such as 0.9, 1.2, 1.5, 2.0, 2.2, 2.5, 2.7, 3.0, or 3.2. In some embodiments, the opening widths $W_{1a}$ and $W_{1b}$ of the recess 140a and 140b may be the same or different. It should be understood that although FIG. 1 merely depicts two light-emitting diodes 120a, 120b and two recesses 140a, 140b, the present invention is not limited thereto, and a suitable number of light-emitting diodes 120 and recesses 140a and 140b may be selected as required.

Please refer to FIGS. 2A-2B. FIGS. 2A-2B are cross-sectional views of recesses 140a and 140b of the light-emitting module structure 100 depicted according to some embodiments of the present invention. In some embodiments, the recesses 140a and 140b may be but not limited to cone recesses (as shown in FIG. 2A) or cylindrical recesses (as shown in FIG. 2B). The recesses 140a, 140b has the bottoms 142a, 142b and bevel edges 143a, 143b. In some embodiments, the bottoms 142a and 142b of the recesses 140a and 140b may be planes, as shown in FIG. 2B. In other embodiments, the bottoms 142a and 142b may be protruded or recessed arcs (not shown in FIG. 2A-2B). In some embodiments, as shown in FIG. 2B, top widths $W_2$ of the recesses 140a and 140b may be greater than bottom widths $W_3$ of the recesses 140. In some embodiments, an included angle θ is between the bevel edges 143a, 143b of the recesses 140a, 140b and a normal line which is perpendicular to the bottoms 142a, 142b, as shown in FIG. 2B. In some embodiments, the range of the included angle θ is 44°<θ<62°, such that the light may be distributed uniformly. For example, the included angle θ may be 45°, 47°, 50°, 52°, 55°, 57°, or 60°.

FIGS. 3A-3B are schematic top views of a light-guiding layer depicted according to some embodiments of the present invention. In some embodiments, the recesses include a plurality of first V-shaped trenches extending along a first direction d1. For example, as shown in FIG. 3A, the light-emitting module structure includes the first V-shaped trenches 140a, 140b, 140c, and 140d extending along the first direction d1. In some embodiments, the recesses further include a plurality of second V-shaped trenches extending along a second direction d2, which is different from the first direction d1, and the first V-shaped trenches intersect with the second V-shaped trenches to form a plurality of intersections. For example, as shown in FIG. 3B, the light-emitting module structure includes the first V-shaped trenches 140a, 140b, 140c, 140d extending along the first direction d1, and the second V-shaped trenches 140e, 140f, 140g, 140h extending along the second direction d2. The first V-shaped trenches 140a, 140b, 140c, 140d intersect respectively with the second V-shaped trenches 140e, 140f, 140g, 140h to form a plurality of intersections 144. In some embodiments, each of the intersections 144 may be aligned with one of the light-emitting diodes 120, respectively.

Figure 4A:
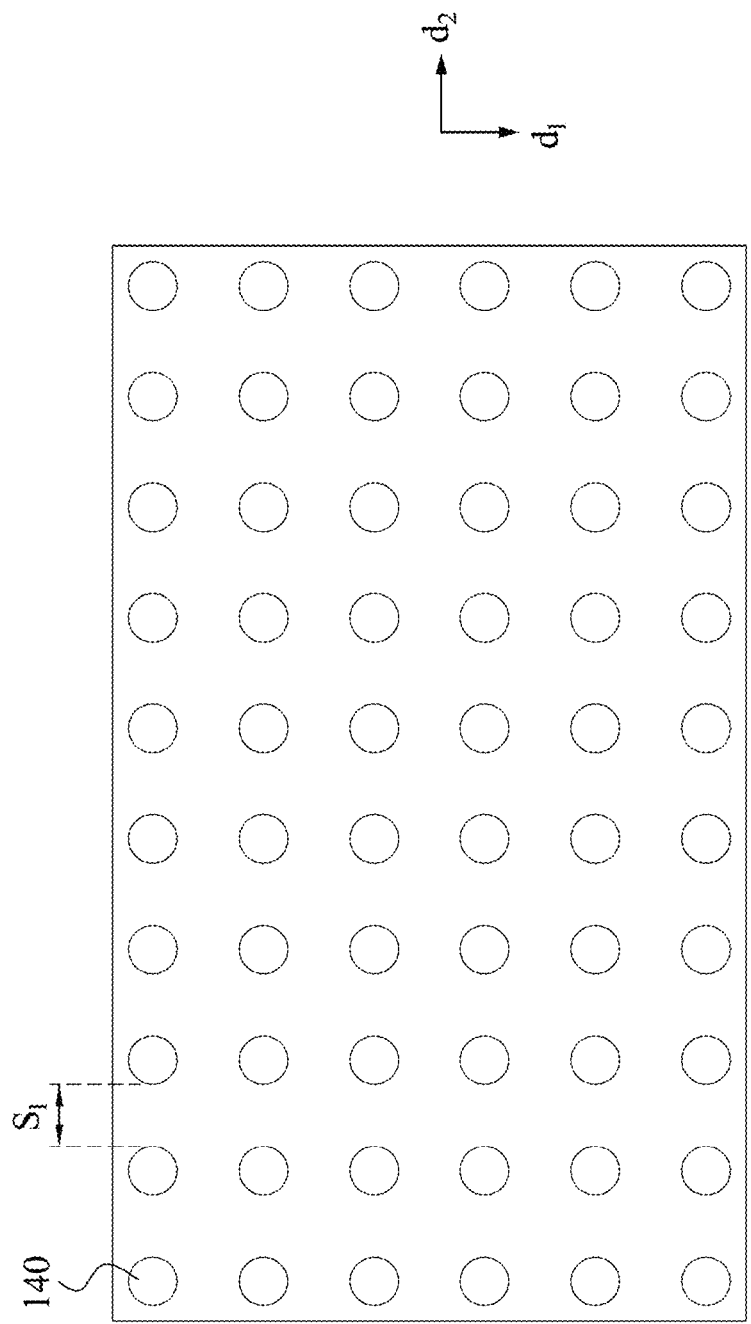
FIGS. 4A-4B are schematic views showing arrangement of recesses according to some embodiments of the present invention.
Figure 4B:
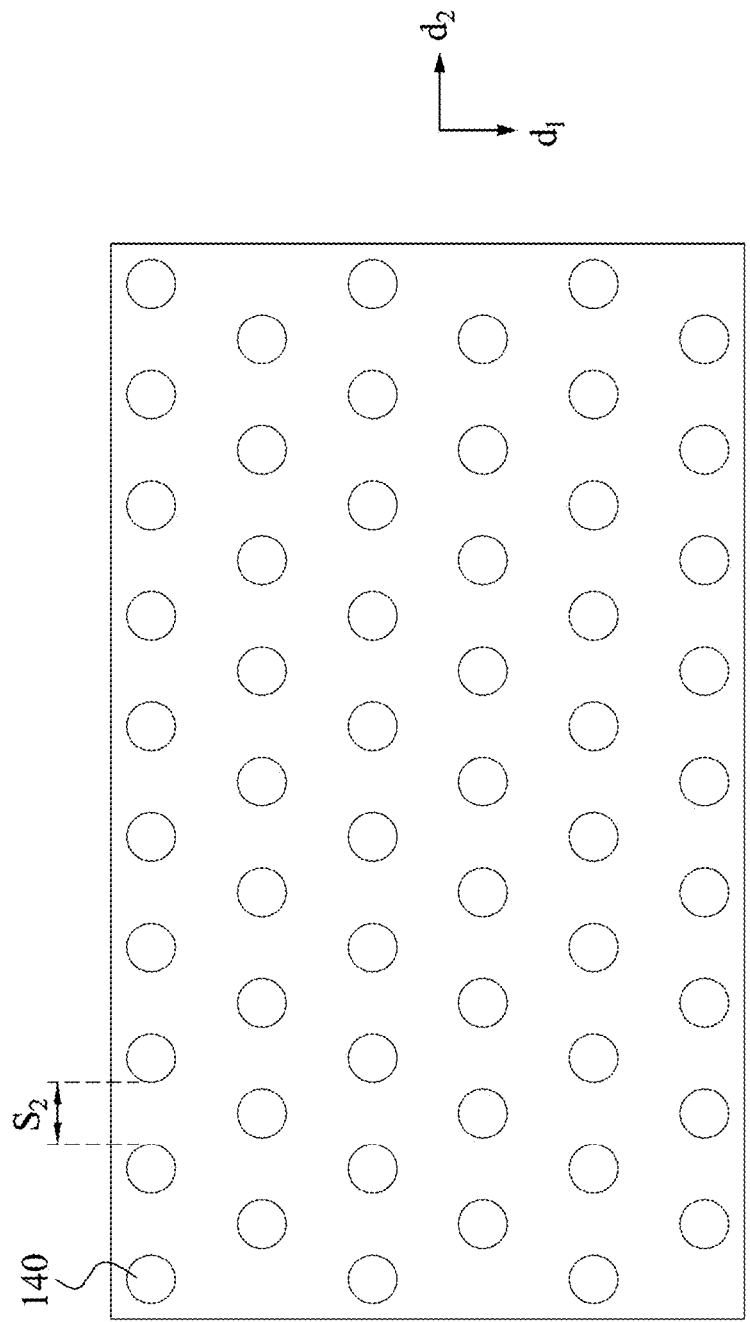

Please refer to FIGS. 4A-4B. FIGS. 4A-4B are schematic views showing arrangement of the recesses 140 depicted according to some embodiments of the present invention. In some embodiments, the arrangement of the recesses 140 may include but not limited to a matrix arrangement (as shown in FIG. 4A) or a honeycomb arrangement (as shown in FIG. 4B). In some embodiments, distances $S_1$ and $S_2$ between the recesses 140 are from about 2 to 15 mm.

Please refer to FIG. 1 again. In some embodiments, the light-emitting module structure 100 may further include at least one crosstalk resistant structure 150 disposed on the substrate 110. In some embodiments, the crosstalk resistant structure 150 is between the light-emitting diode 120a and the light-emitting diode 120b. In some embodiments, the crosstalk resistant structure 150 includes but not limited to titanium dioxide, silicone resin, or a combination thereof. The crosstalk resistant structure 150 may scatter and/or reflect the lights emitted from the light-emitting diodes 120a and 120b, so as to avoid any interference of light. In some embodiments, the crosstalk resistant structure 150 includes but not limited to a cone or a cylinder. In some embodiments, a height $H_1$ of the crosstalk resistant structure 150 is greater than or equal to a height $H_2$ of the light-emitting diode 120. In other embodiments, the light-emitting module structure 100 may have no crosstalk resistant structure 150.

Figure 5:
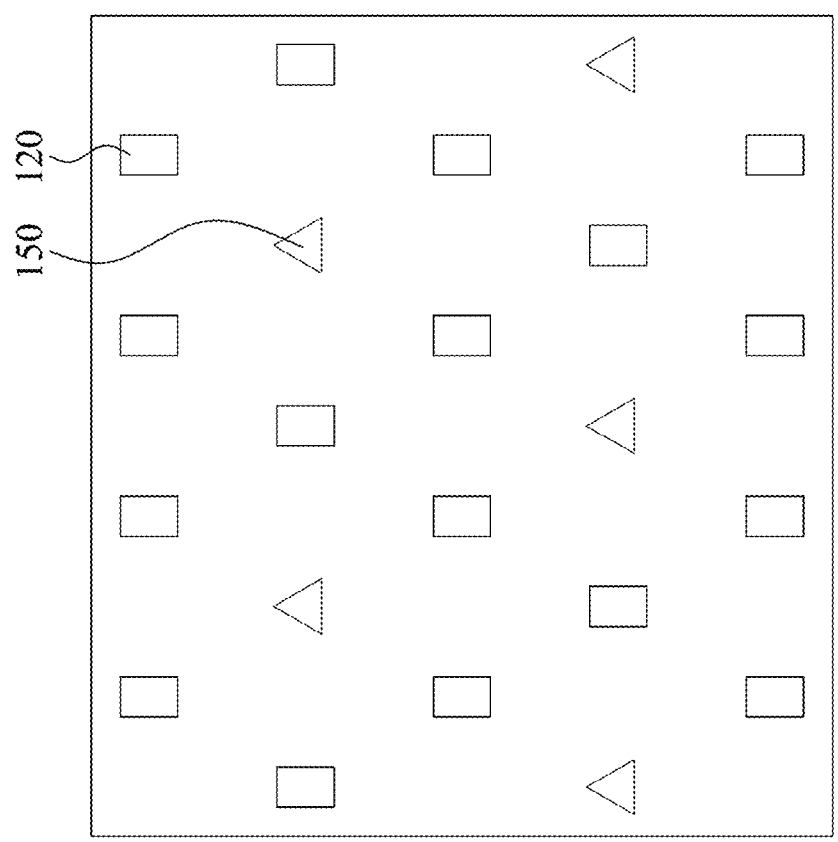
FIG. 5 is a schematic top view of a light-emitting module structure according to some embodiments of the present invention.

FIG. 5 is a schematic top view of a light-emitting module structure depicted according to some embodiments of the present invention. In some embodiments, the light-emitting diodes 120 may be arranged as a regular hexagon, and the crosstalk resistant structure 150 is positioned at a center of the regular hexagon. This arrangement enables the light-emitting module structure to keep a good brightness and uniformity while the number of the light-emitting diodes 120 is reduced.

Still referring to FIG. 1, in some embodiments, the light-emitting module structure 100 further includes at least one reflection structure 160 disposed on a part of the upper surface 132 of the light-guiding layer 130. The reflection structure 160 has a reflection surface 162 immediately neighboring the upper surface 132 of the light-guiding layer 130. In some embodiments, the reflection surface 162 may be a scattering reflection surface or a mirror reflection surface. In some embodiments, the reflection structure 160 includes but not limited to titanium dioxide, silicon dioxide, or a combination thereof. It should be understood that the location, quantity, and size of the reflection structure 160 shown in FIG. 1 are merely exemplary, the reflection structure 160 may be located anywhere on the upper surface 132 of the light-guiding layer 130, and the quantity and size of the reflection structure 160 may be selected depending on the needed. In other embodiments, the reflection structure 160 may be omitted.

It should be understood that the relationship between elements and the material of the components described above will not be repeated hereinafter. In the following description, other light-emitting module structures will be described.

Figure 6:
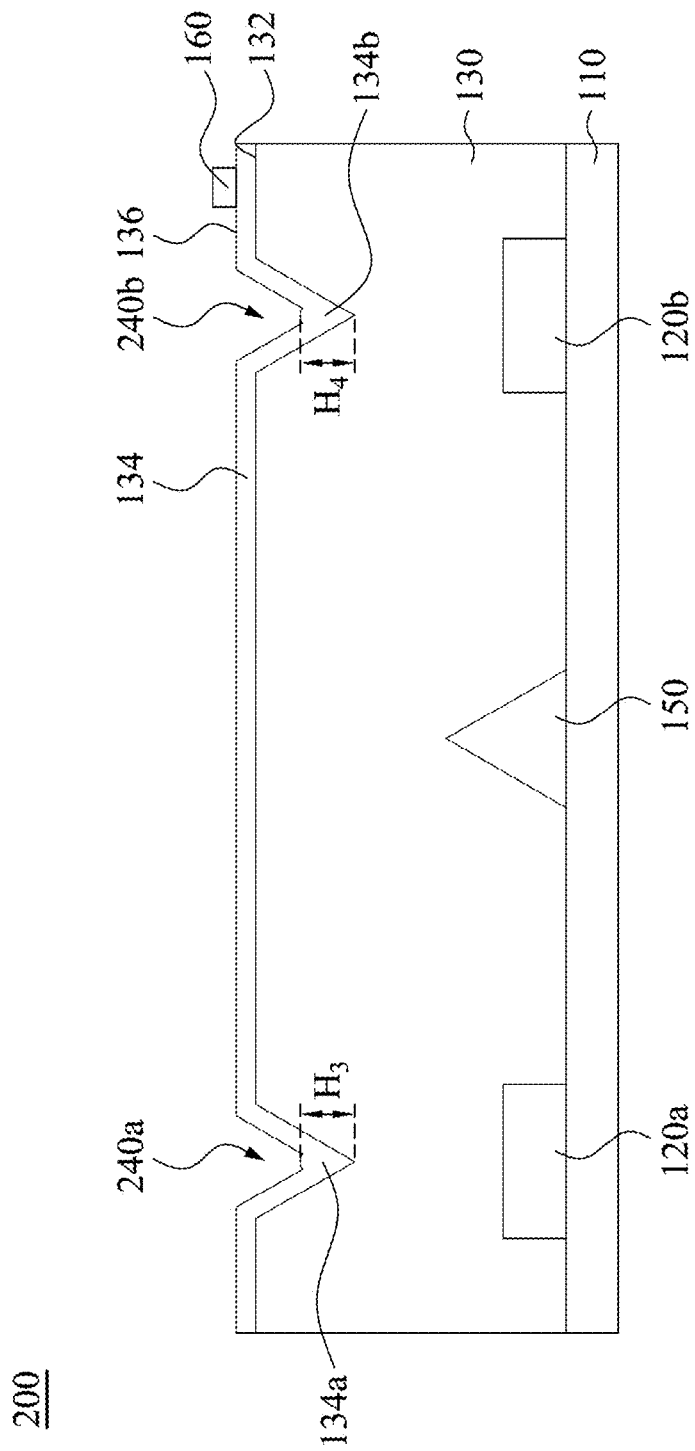
FIG. 6 is a cross-sectional view of a light-emitting module structure according to various embodiments of the present invention.

FIG. 6 is a cross-sectional view of a light-emitting module structure 200 depicted according to various embodiments of the present invention. The difference between the light-emitting module structure 200 and the light-emitting module structure 100 shown in FIG. 1 is that the light-emitting module structure 200 further includes a transparent glue layer 134 on the upper surface 132 of the light-guiding layer 130.

As shown in FIG. 6, the transparent glue layer 134 covers the upper surface 132 of the light-guiding layer 130, and the transparent glue layer 134 fills the recesses 240a and 240b. The transparent glue layer 134 in the recesses 240a and 240b has protruded glue accumulation regions 134a and 134b. The glue accumulation regions 134a and 134b can improve the light extraction efficiency of the light-emitting module structure 200 and increase the brightness of the light-emitting module structure 200. In some embodiments, the glue accumulation regions 134a and 134b respectively has thicknesses $H_3$ and $H_4$ from about 5 to 20 μm. In some embodiments, the transparent glue layer 134 and the light-guiding layer 130 may be made of a same material, and the upper surface 136 of the transparent glue layer 134 is a reflection surface or a refraction surface. In such a case, the upper surface 132 of the light-guiding layer 130 may not be a reflection surface or a refraction surface. In some embodiments, at least one reflection structure 160a may further be disposed on a part of the upper surface 136 of the transparent glue layer 134, and the location, quantity, and size of the reflection structure 160 are not limited to those shown in FIG. 6.

Figure 7B:
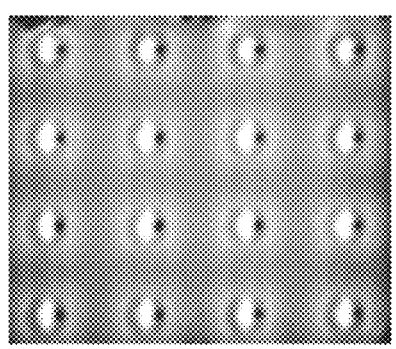
FIGS. 7A-7D are photos of a light-emitting module structure according to some embodiments of the present invention.
Figure 7D:
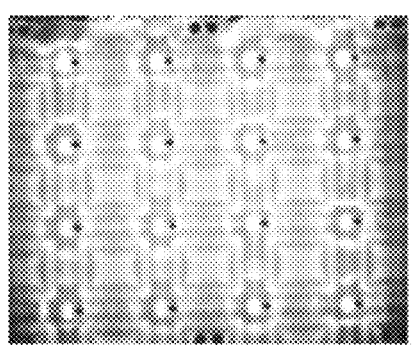
Figure 7A:
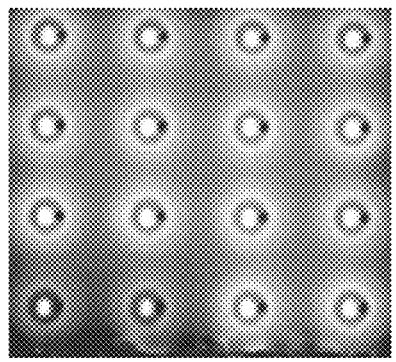
Figure 7C:
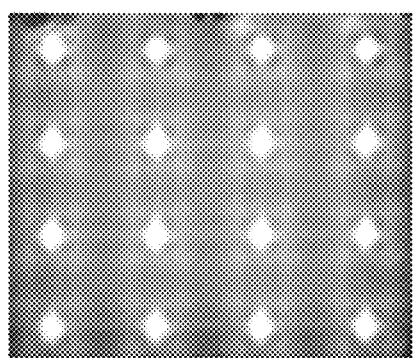

FIGS. 7A-7D are photos of a light-emitting module structure according to some embodiments of the present invention. FIG. 7A is a photo of the light-emitting module structure where the upper surface 132 of the light-guiding layer 130 has no recess 140. FIG. 7B is a photo of the light-emitting module structure where the upper surface 132 of the light-guiding layer 130 has a plurality of first V-shaped trenches extending along the first direction d1. FIG. 7C is a photo of the light-emitting module structure where the upper surface 132 of the light-guiding layer 130 has a plurality of first V-shaped trenches extending along the first direction d1 and a plurality of second V-shaped trenches extending along a second direction d2. FIG. 7D is a photo of the light-emitting module structure shown the FIG. 7C where the recesses of the light-emitting module structure have glue accumulation regions. From FIGS. 7A-7D, it is clear that the light-emitting module structure shown in FIG. 7D has the best brightness and uniformity. However, the light-emitting module structure shown in FIG. 7A having no recess has the worst brightness and uniformity. In addition, compared with the light-emitting module structure shown in FIG. 7B, the light-emitting module structure shown in FIG. 7C has a better brightness and uniformity.

Figure 8:
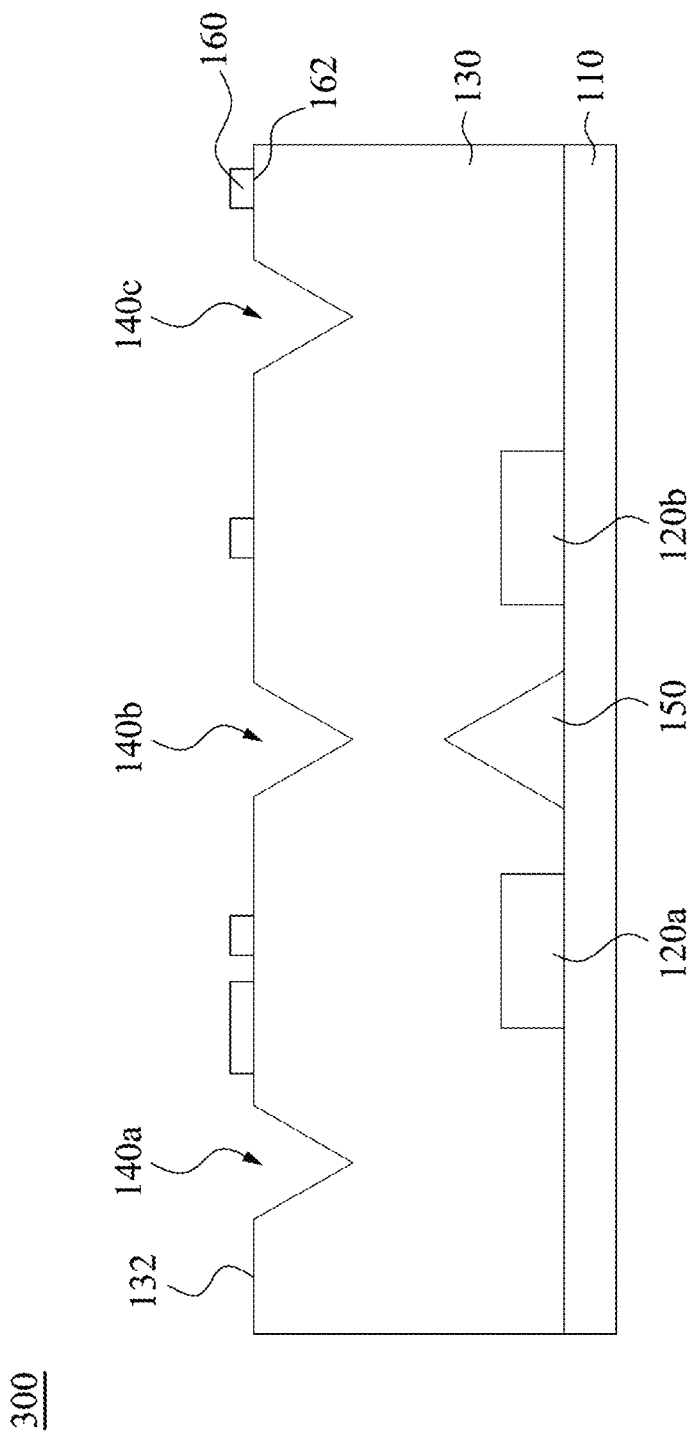
FIGS. 8-11 are cross-sectional views of a light-emitting module structure according to various embodiments of the present invention.

FIG. 8 is a cross-sectional view of a light-emitting module structure 300 depicted according to some embodiments of the present invention. The difference between the light-emitting module structure 300 and the light-emitting module structure 100 shown in FIG. 1 is that the recesses 140 in the light-emitting module structure 300 are not disposed above the light-emitting diodes 120. More particularly, the recesses 140 in the light-emitting module structure 300 may be disposed between any two adjacent light-emitting diodes 120 but not overlapping with any light-emitting diode 120. For example, as shown in FIG. 8, a recess 140b is between the light-emitting diodes 120a and 120b but not overlapping with the light-emitting diode 120a or 120b. It should be understood that although FIG. 1 merely depicts two light-emitting diodes 120a and 120b and three recesses 140a, 140b, and 140c, the present invention is not limited thereto. A suitable number of light-emitting diodes 120 and recesses 140 may be selected depending on the needed. Besides, although FIG. 8 depicts that the recess 140b is aligned with a crosstalk resistant structure 150, in other embodiments, the recess 140b may not be aligned with the crosstalk resistant structure 150.

Figure 9:
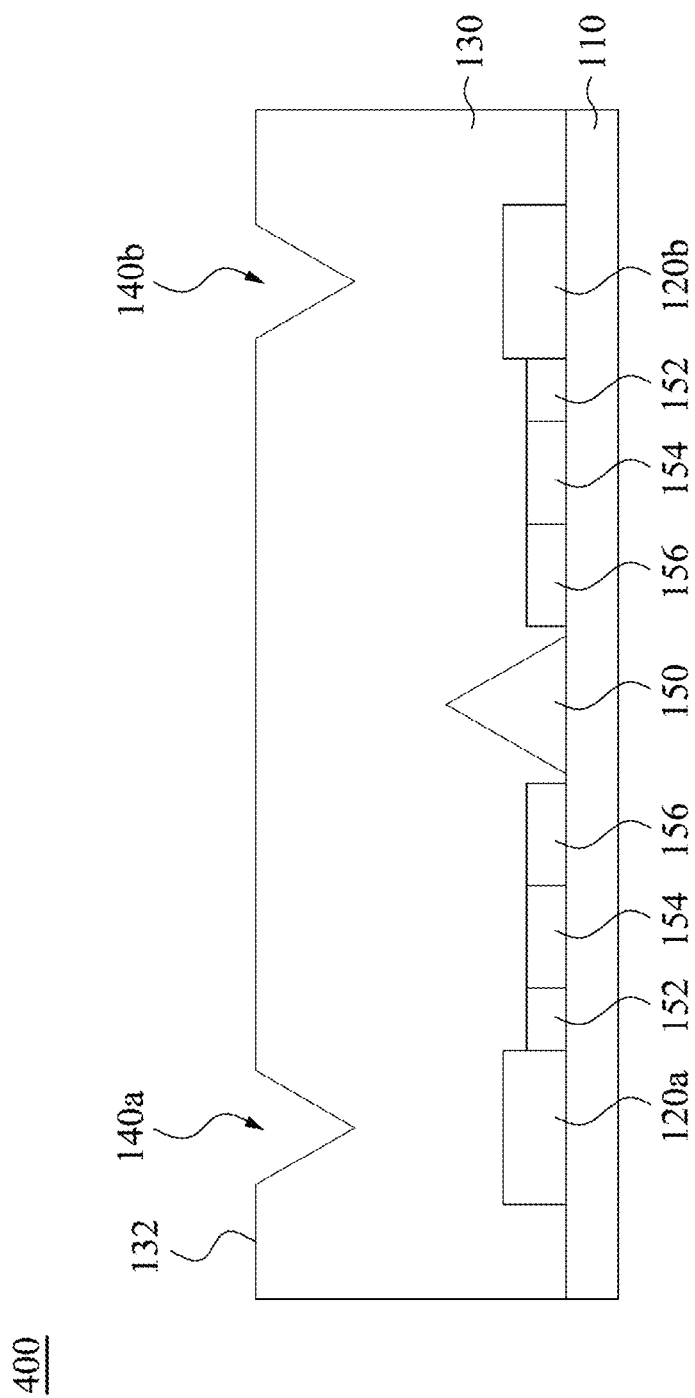

FIG. 9 is a cross-sectional view of a light-emitting module structure 400 depicted according to some embodiments of the present invention. The difference between the light-emitting module structure 400 and the light-emitting module structure 100 shown in FIG. 1 is that the light-emitting module structure 400 further includes a plurality of bottom reflection structures 152, 156, and a plurality of bottom scattering structures 154 disposed on the substrate 110, and disposed between two adjacent light-emitting diodes 120a and 120b.

As shown in FIG. 9, the bottom scattering structures 154 and the bottom reflection structures 152, 156 are disposed between two adjacent light-emitting diodes 120a, 120b, and two opposite sides of the crosstalk resistant structure 150 both have the bottom scattering structures 154 and the bottom reflection structures 152 and 156. In some embodiments, the bottom reflection structures 152 are respectively adjacent to the light-emitting diodes 120a, 120b, the bottom reflection structures 156 are adjacent to the crosstalk resistant structure 150, and the bottom scattering structures 154 are between the bottom reflection structure 152 and the bottom reflection structure 156. In some embodiments, the light-emitting module structure 400 may only have the bottom reflection structures 152 or the bottom reflection structures 156 but has no bottom scattering structures 154. In some embodiments, the light-emitting module structure 400 may only have the bottom scattering structures 154 but has no bottom reflection structures 152 or bottom reflection structures 156. In some embodiments, the bottom reflection structures 152, 156 include but not limited to mirror metal materials, such as silver, aluminum. In some embodiments, the bottom scattering structures 154 include but not limited to titanium dioxide, silicon dioxide, or a combination thereof.

It should be understood that suitable arrangements, quantities and size of the bottom scattering structures 154 and the bottom reflection structures 152, 156 may be selected depending on the needed, which would not be described hereinafter, and FIG. 9 is merely an example. In addition, the shape, location, and quantity of recesses may be the same as any embodiment described above, which would not be described hereinafter.

Figure 10:
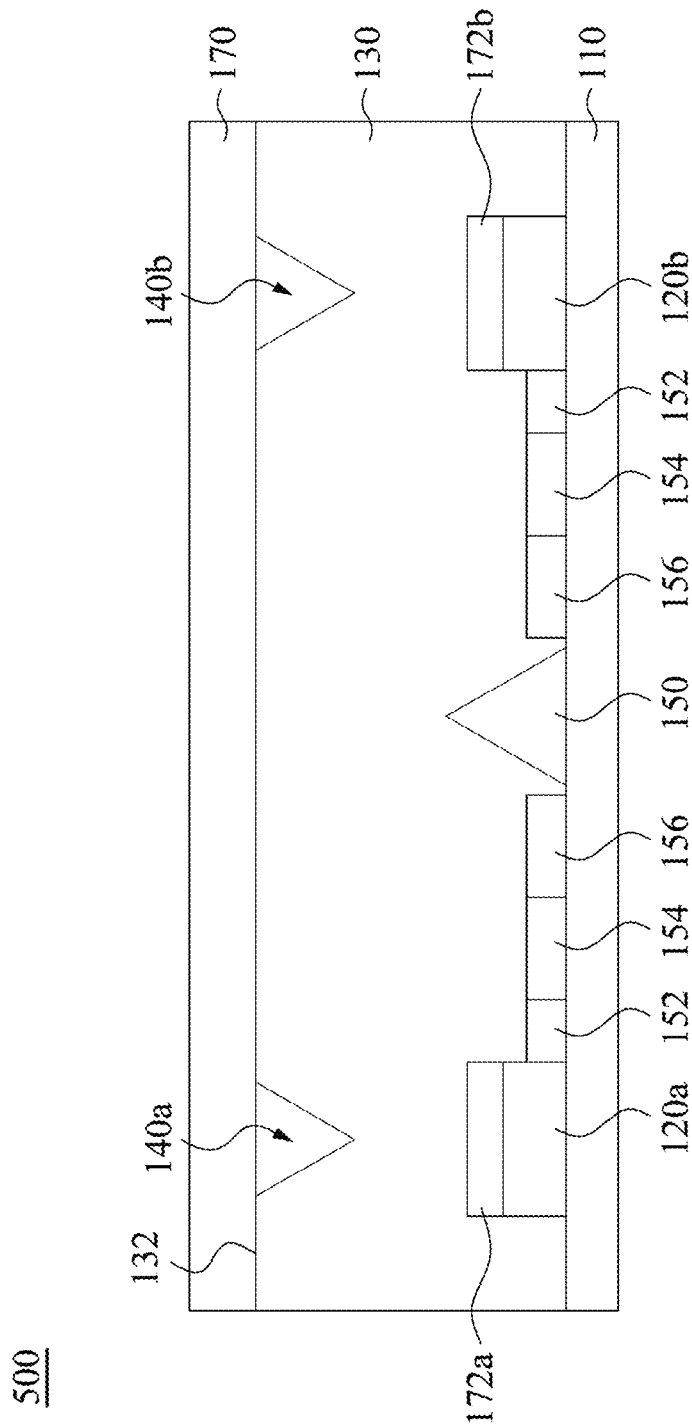

FIG. 10 is a cross-sectional view of a light-emitting module structure 500 depicted according to some embodiments of the present invention. The difference between the light-emitting module structure 500 and the light-emitting module structure 400 shown in FIG. 9 is that the light-emitting module structure 500 further includes phosphor layers 170, 172a and 172b. The phosphor layer 170 is on the upper surface 132 of the light-guiding layer 130, and the phosphor layers 172a, 172b are on the light-emitting diodes 120a, 120b, respectively.

As shown in FIG. 10, the phosphor layer 170 covers the upper surface 132 of the light-guiding layer 130 and the recesses 140a, 140b, the phosphor layer 172a covers the light-emitting diode 120a, and the phosphor layer 172b covers the light-emitting diode 120b. In some embodiments, the phosphor layer 170 may be replaced by a quantum dot layer. In other embodiments, the quantum dot layer may be a quantum dot in glass tube.

In some embodiments, one of the phosphor layers 172a and 172b may be omitted. In other embodiments, the light-emitting module structure 500 may merely have the phosphor layer 170 but have no phosphor layer 172a or 172b. In some embodiments, the phosphor layers 170, 172a, 172b may respectively include at least one phosphor. For example, the phosphor layer 170 may include red, green, and blue phosphors. In some embodiments, the phosphor layers 172a, 172b may include phosphors with different colors. For example, the phosphor layer 172a includes the red phosphor, and the phosphor layer 172b includes the green phosphor.

Figure 11:
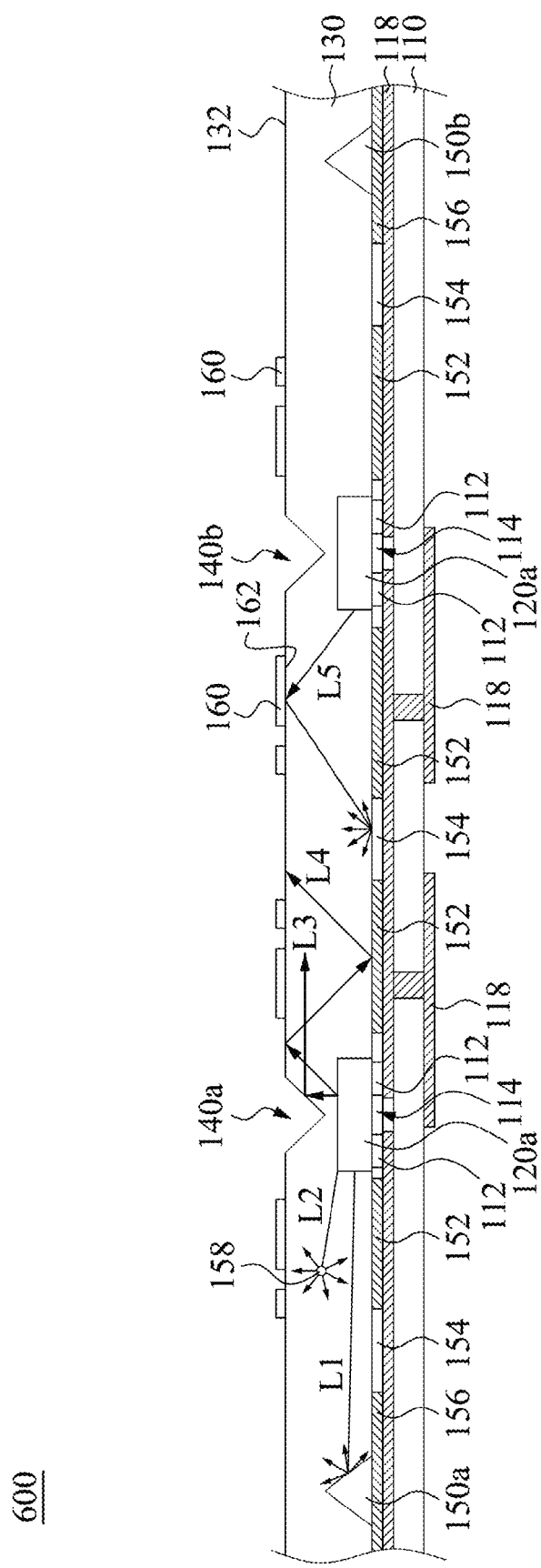

FIG. 11 is a cross-sectional view of a light-emitting module structure 600 depicted according to some embodiments of the present invention. Referring to FIG. 11, the light-emitting module structure 600 includes a substrate 110, a plurality of light-emitting diodes (e.g., light-emitting diodes 120a, 120b) and a light-guiding layer 130. The light-emitting diodes 120a, 120b are disposed on the substrate 110. The light-guiding layer 130 is disposed on the substrate 110 and covers the light-emitting diodes 120a and 120b. The upper surface 132 of the light-guiding layer 130 has recesses 140a and 140b. The light-emitting module structure 600 may further include other elements, which will be described below.

Figure 12A:
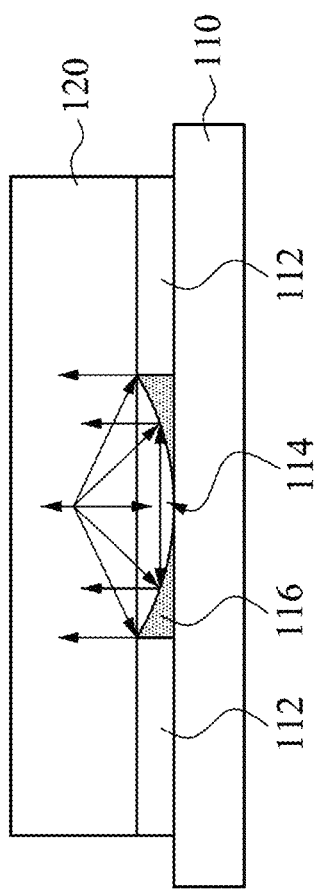
FIGS. 12A-12B are partially enlarged schematic views of a light-emitting module structure according to some embodiments of the present invention.
Figure 12B:
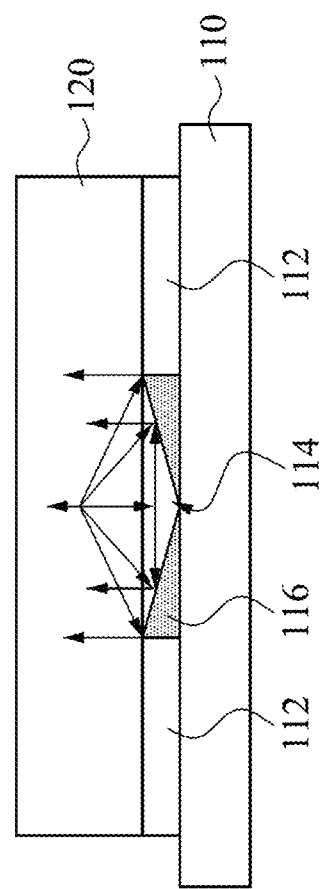

In some embodiments, the light-emitting module structure 600 further includes conductive pads 112 and conductive structures 118. The light-emitting diodes 120 are electrically connected to the conductive structures 118 via the conductive pads 112. In some embodiments, the light-emitting module structure 600 further includes an insulation material (not shown in FIG. 11) below the substrate 110. FIGS. 12A-12B are partially enlarged schematic views of a light-emitting module structure depicted according to some embodiments of the present invention. Referring to FIGS. 12A-12B, in some embodiments, the conductive pads 112 are between the substrate 110 and the light-emitting diodes 120. A pit 114 is between the conductive pads 112, and a concave structure 116 is in the pit 114. In some embodiments, the concave structure 116 includes mirror metal material, titanium dioxide, silicon dioxide, or a combination thereof. In some embodiments, the section of the concave structure 116 may be but not limited to U-shaped (FIG. 12A) or V-shaped (FIG. 12B). As shown in FIGS. 12A-12B, light emitted from the light-emitting diodes 120 may be reflected at the surfaces of the concave structure 116, and the light may be gathered and passed upward to improve the brightness of the light-emitting module structure.

Please refer to FIG. 11 again. In some embodiments, the light-emitting module structure 600 further includes a plurality of scattering particles 158, and the scattering particles 158 may be distributed anywhere within the light-guiding layer 130. In some embodiments, the scattering particles 158 include but not limited to titanium dioxide, silicon dioxide, or a combination thereof.

In some embodiments, the light-emitting module structure 600 further includes at least one reflection structure 160 on a part of the upper surface 132 of the light-guiding layer 130, and the reflection structure 160 has a reflection surface immediately neighboring the upper surface 132 of the light-guiding layer 130.

In some embodiments, the light-emitting module structure 600 further includes crosstalk resistant structures 150a, 150b, bottom reflection structures 152 and bottom scattering structures 154 on the substrate 110. The crosstalk resistant structures 150a, 150b are on the bottom reflection structures 152, the crosstalk resistant structure 150a is disposed on the side of the light-emitting diode 120a far away from the light-emitting diode 120b, and the crosstalk resistant structure 150b is disposed on the side of the light-emitting diode 120b far away from the light-emitting diode 120a. In some embodiments, the light-emitting module structure 600 further includes at least one crosstalk resistant structure between the light-emitting diodes 120a and 120b (as shown in FIG. 1). In some embodiments, the bottom reflection structures 152 and the bottom scattering structures 154 are disposed between the light-emitting diodes 120a and 120b, between the crosstalk resistant structure 150a and the light-emitting diode 120a, and between the crosstalk resistant structure 150b and the light-emitting diode 120b.

As shown in FIG. 11, in some embodiments, a light L1 is scattered and/or reflected at the crosstalk resistant structures 150a, 150b. Therefore, the light L1 would not cross talk with the light emitted from the light-emitting diode (not shown) on the other side of the crosstalk resistant structure 150a, such that the local dimming issue may be further improved. In some embodiments, a light L2 transmitting in the light-guiding layer 130 is scattered by the scattering particles 158, such that the light may be distributed more uniformly. In some embodiments, a light L3 is reflected by the recess 140a on the upper surface 132 of the light-guiding layer 130, such that the light L3 may be transmitted further in the light-guiding layer 130. In some embodiments, a light L4 is reflected at the upper surface 132 of the light-guiding layer 130, the light L4 is then transmitted to the bottom reflection structures 152 and be reflected again, such that the light L4 may be transmitted further in the light-guiding layer 130. Accordingly, the light-emitting module structure can maintain a good brightness and uniformity while enlarging the distances between the light-emitting diodes 120, such that the usage amount of light-emitting diodes can be reduced. In some embodiments, when a light L5 is transmitted to the reflection structure 160, the reflection surface 162 reflects the light L5 to the bottom scattering structures 154, and the light L5 is then be scattered, thus obtaining a uniform light.

Figure 13:
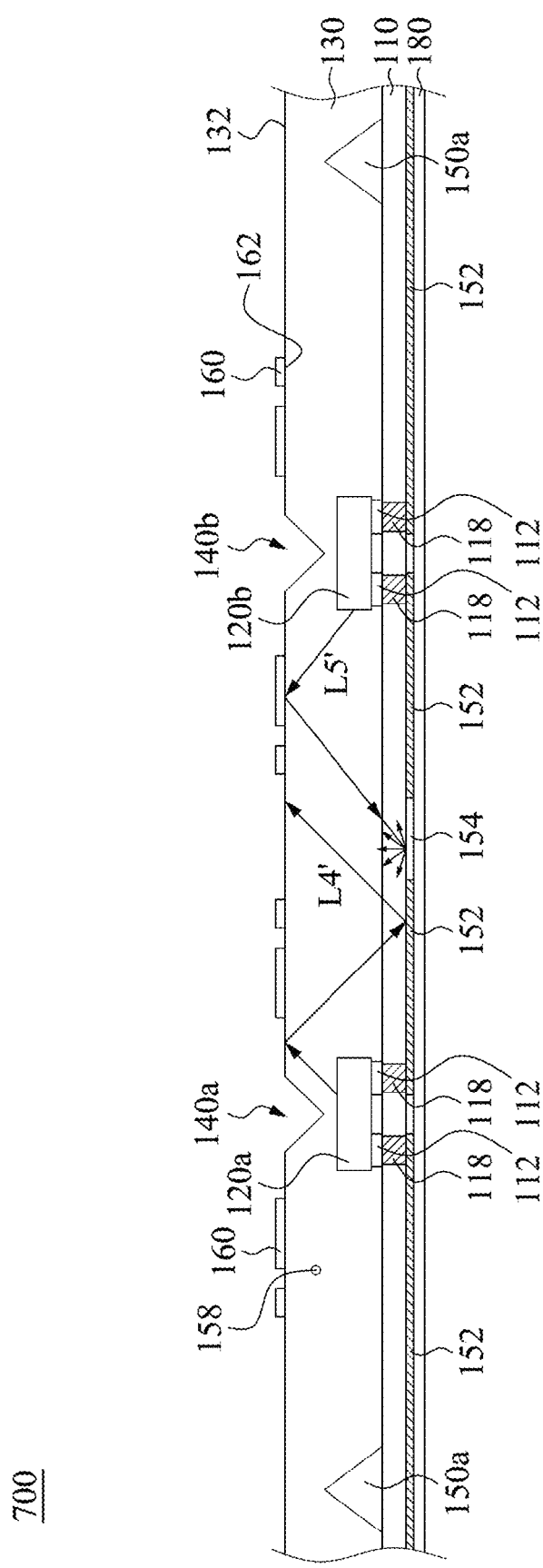
FIG. 13 is a cross-sectional view of a light-emitting module structure according to various embodiments of the present invention.

FIG. 13 is a cross-sectional view of a light-emitting module structure 700 depicted according to some embodiments of the present invention. The difference between the light-emitting module structure 700 and the light-emitting module structure 600 shown in FIG. 11 is that the bottom reflection structures 152 and bottom scattering structures 154 of the light-emitting module structure 700 is disposed under the substrate 110, and the conductive structures 118 are disposed in the substrate 110.

In some embodiments, the substrate 110 of the light-emitting module structure 700 directly contacts the light-guiding layer 130, and the substrate 110 is a transparent substrate. In the light-emitting module structure 700 shown in FIG. 13, the light emitted from the light-emitting diodes 120 may be transmitted in the transparent substrate 110 and the light-guiding layer 130, and then be reflected and/or scattered by the bottom reflection structures 152 and/or the bottom scattering structures 154. Therefore, the light transmission path is changed and the transmitting distance is increased. For example, compared with the light L4 shown in FIG. 11, the light L4' shown in FIG. 13 may be transmitted further.

In some embodiments, the light-emitting module structure 700 further includes a reflective insulation layer 180 under the bottom reflection structures 152 and the bottom scattering structures 154. In some embodiments, the reflective insulation layer 180 includes but not limited to titanium dioxide, silicon dioxide, or a combination thereof.

Figure 14:
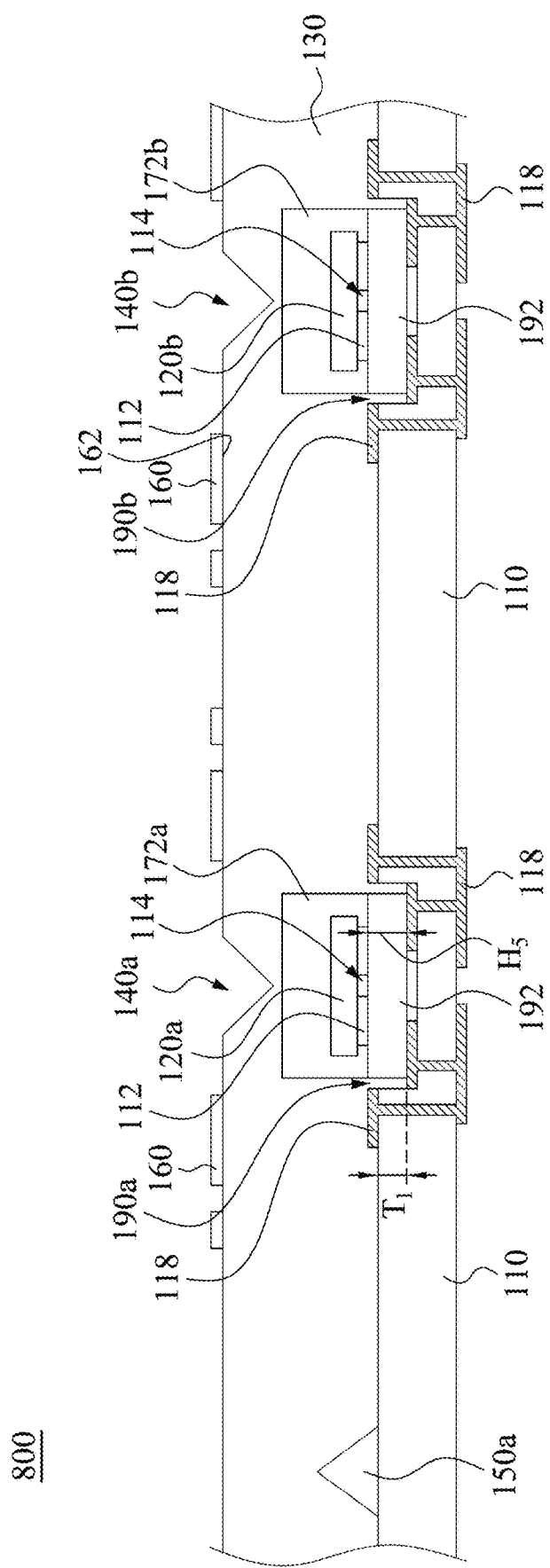
FIG. 14 is a cross-sectional view of a light-emitting module structure according to various embodiments of the present invention.

FIG. 14 is a cross-sectional view of a light-emitting module structure 800 depicted according to some embodiments of the present invention. The difference between the light-emitting module structure 800 and the light-emitting module structure 600 shown in FIG. 11 is that the substrate 110 of the light-emitting module structure 800 has at least one cavity (e.g., the cavities 190a and 190b), and the light-emitting diodes (e.g., the light-emitting diodes 120a and 120b) are correspondingly disposed within the cavities. As shown in FIG. 14, the light-emitting diodes 120a, 120b are respectively disposed within the cavities 190a, 190b, and the light-emitting diodes 120a, 120b are electrically connected to the conductive structures 118 via the conductive pads 112 and conductive substrates 192. It should be noted that, for simplifying the drawings, the crosstalk resistant structure 150b, the bottom reflection structures 152, and the bottom scattering structures 154 are omitted in FIG. 14. In fact, the light-emitting module structure 800 may also has the crosstalk resistant structures 150a, 150b, the bottom reflection structures 152, and the bottom scattering structures 154, which are disposed as the embodiments shown in FIG. 11 or 13.

In some embodiments, the light-emitting diodes 120a, 120b may be chip size package (CSP) light-emitting diodes or flip chip light-emitting diodes. In some embodiments, the cavity 190 has a depth $T_1$, and the conductive substrate 192 has a height $H_5$. In some embodiments, the depth $T_1$ of the cavity 190 is smaller than the height $H_5$ of the conductive substrate 192. In some embodiments, the light-emitting module structure 800 further includes phosphor layers 172a, 172b respectively covering the light-emitting diodes 120a, 120b. Applying the light-emitting module structure 800 shown in FIG. 14 to a back light unit (BLU) may improve the white light yield, pick-and-place yield, brightness, and optical angle of the module.

As described above, according to embodiments of the present invention, through the optical designs of the light-guiding layer and the substrate (e.g., recesses and reflection structures on the upper surface of the light-guiding layer, bottom reflection structures and bottom scattering structures on or under the substrate, and crosstalk resistant structures between the light-emitting diodes, etc.), the light emitted from the light-emitting diodes may be distributed more uniformly, such that the light may be transmitted further in the light-guiding layer. Therefore, the light-emitting module structure of the present invention may reduce the usage amount of the light-emitting diodes. Further, the light-emitting module structure of the present invention has smaller optical distance (OD).

In addition, the recesses having glue accumulation regions therein can increase the light extraction efficiency and thus improve the brightness of the light-emitting module. The concave structure between the light-emitting diodes and the substrate has a light-concentrating effect, such that the light emitted from the light-emitting diodes can be gathered and passed upward, to improve the brightness of the light-emitting module.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A light-emitting module structure, comprising:
a substrate, wherein the substrate is an opaque substrate;

a plurality of light-emitting diodes disposed on the substrate;

a light-guiding layer covering the light-emitting diodes, wherein the light-guiding layer has an upper surface, the upper surface has a plurality of recesses, and each of the recesses is between the light-emitting diodes; and a plurality of scattering structures disposed on the substrate, wherein the plurality of scattering structures are covered by the light-guiding layer, and an upper surface of the plurality of scattering structures is lower than the plurality of recesses.

2. The light-emitting module structure of claim 1, further comprising a plurality of crosstalk resistant structures disposed on the substrate, wherein each of the crosstalk resistant structures is between the light-emitting diodes.

3. The light-emitting module structure of claim 2, wherein each of the scattering structures is arranged between two adjacent ones of the light-emitting diodes and disposed on two opposite sides of each of the crosstalk resistant structures.

4. The light-emitting module structure of claim 3, further comprising a plurality of reflection structures disposed on the substrate, wherein each of the reflection structures is arranged between two adjacent ones of the light-emitting diodes and disposed on two opposite sides of each of the crosstalk resistant structures.

5. The light-emitting module structure of claim 2, wherein the light-emitting diodes are arranged as a regular hexagon, and each of the crosstalk resistant structures is positioned at a center of the regular hexagon.

6. The light-emitting module structure of claim 2, wherein the crosstalk resistant structures comprise a plurality of cones or a plurality of cylinders, and each of the crosstalk resistant structures has a height that is greater than or equal to a height of the light-emitting diodes.

7. The light-emitting module structure of claim 1, further comprising at least one reflection structure disposed on a part of the upper surface of the light-guiding layer, wherein the reflection structure has a reflection surface immediately neighboring the upper surface, and the reflection surface is a scattering reflection surface or a mirror reflection surface.

8. The light-emitting module structure of claim 1, wherein the recesses comprise a plurality of first V-shaped trenches extending along a first direction.

9. The light-emitting module structure of claim 8, wherein the recesses further comprise a plurality of second V-shaped trenches extending along a second direction, the second direction is different from the first direction, the first V-shaped trenches intersect with the second V-shaped trenches to form a plurality of intersections.

10. The light-emitting module structure of claim 1, further comprising a transparent glue layer on the upper surface of the light-guiding layer, wherein the transparent glue layer fills the recesses.

11. The light-emitting module structure of claim 10, wherein the transparent glue layer in the recesses has a protruding glue accumulation portion.

12. The light-emitting module structure of claim 1, wherein the substrate has at least one cavity, and at least one of the light-emitting diodes is correspondingly disposed in the at least one cavity, wherein the light-emitting diodes are chip size package light-emitting diodes.

* * * * *